Patented May 8, 1923.

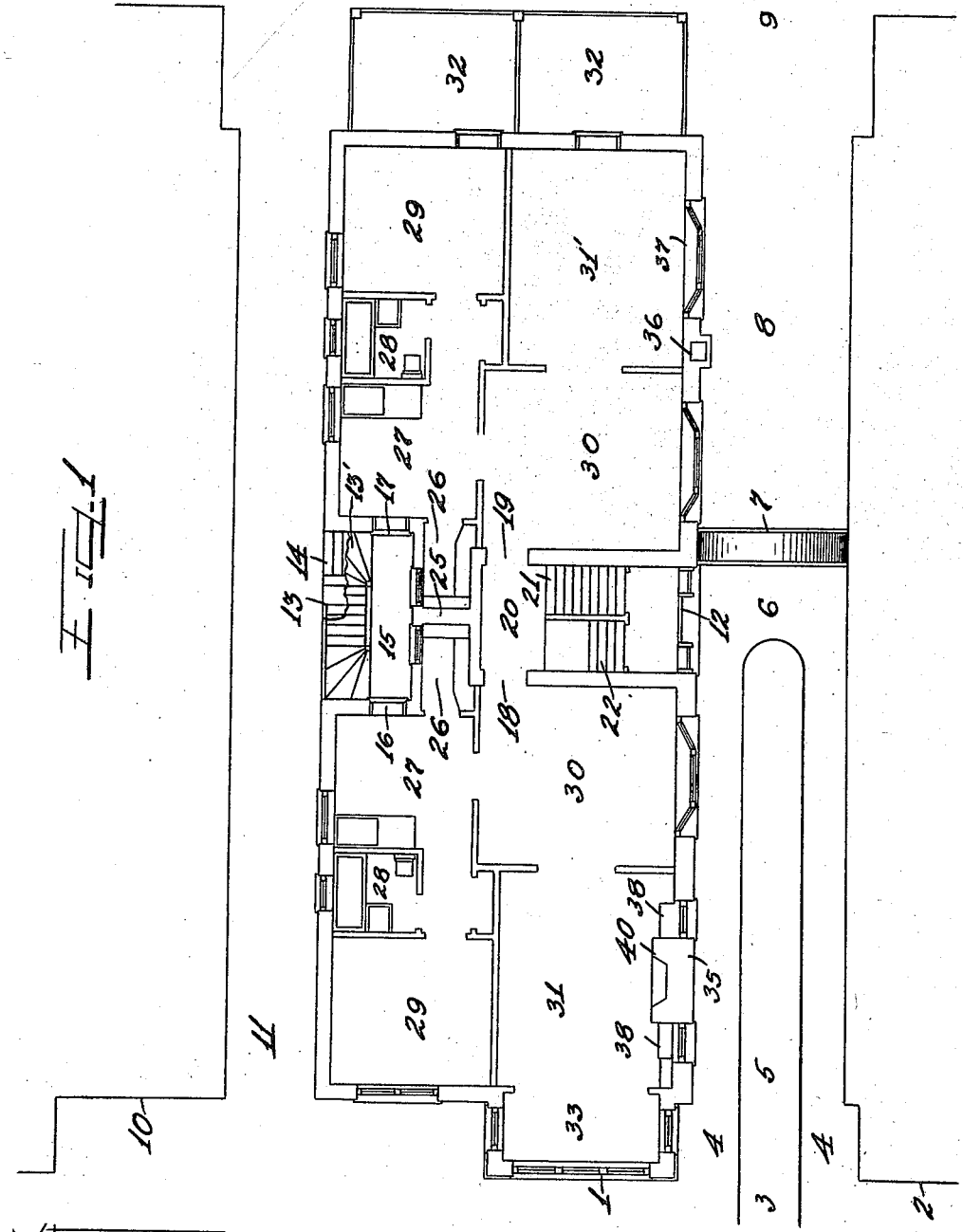

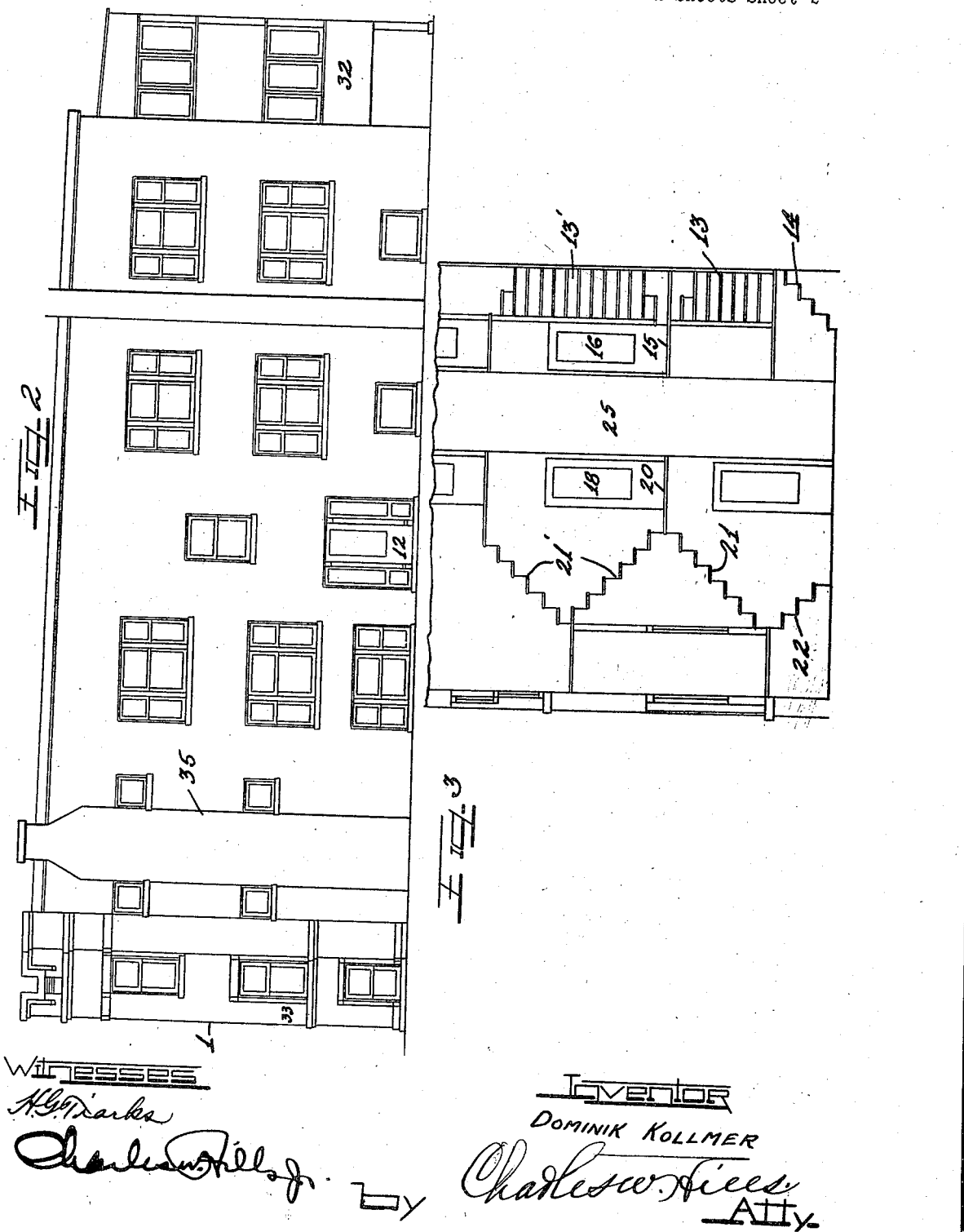

1,454,241

UNITED STATES PATENT OFFICE.

DOMINIK KOLLMER, OF CHICAGO, ILLINOIS.

APARTMENT HOUSE.

Application filed March 13, 1922. Serial No. 543,488.

*To all whom it may concern:*

Be it known that I, DOMINIK KOLLMER, a citizen of the United States, and a resident of the city of Chicago, in the county of Cook and State of Illinois, have invented certain new and useful Improvements in Apartment Houses; and I do hereby declare that the following is a full, clear, and exact description of the same, reference being had to the accompanying drawings, and to the numerals of reference marked thereon, which form a part of this specification.

This invention relates to the arrangement of apartment houses in city blocks.

It is an object of this invention to provide an apartment house which is adapted to a narrow city lot and which will make a more effective use of the space available in such a lot.

It is a further object of this invention to provide a series of apartment houses with passageways between them, the passageways on one side of each house being wide and leading to the principal entrance, while the passageways on the other side are narrow and lead to the entrance for the delivery of merchandise, and the removal of ashes and garbage.

It is a further object of this invention to so arrange the stairways in an apartment house that the space occupied by the stairs and by the passages leading to or from them shall go transversely and not longitudinally of the house.

Other and further important objects of this invention will be apparent from the disclosures in the specification and the accompanying drawings.

The invention (in a preferred form) is shown on the drawings and hereinafter more fully described.

On the drawings:

Figure 1 is a floor plan view showing the arrangement of the apartment houses.

Figure 2 is a side elevation of an apartment house, looking at the side having the principal entrance.

Figure 3 is a section through the stairways.

As shown on the drawings:

The apartment house 1 is separated from its neighbor 2 by a passageway 3 which includes two paved walks 4 with a space 5 between them which may be utilized for flowers or other ornaments. The two walks 4 are preferably connected at the rear end of the space 5 by a paved space 6, immediately at the rear of which is a barrier 7 in the form of a trellis for ornamental vines or in any other desired form which shall obstruct the view from the street toward the space 8 at the rear of the barrier 7. If preferred, a gate may be provided in this barrier giving access to the grass plot 8 behind it, although ordinarily it would not be desirable because those having business in the back yard should go through the alley 11. The space 8 is preferably used for grass or other ground covering that shall give a pleasing effect, and it merges at the rear 9 with the yards that are behind the apartment houses. The yards may or may not be divided by fences, as is desired. Between the apartment house 1 and its neighbor 10 on the other side is a passageway 11 which is preferably paved and which goes completely through from the street to the yard.

Each of the apartment houses is provided with a principal entrance 12 for the use of the guests and tenants. The building also has a subordinate entrance for the use of the parties delivering merchandise or removing ashes and garbage. This entrance is preferably in the form of a flight of steps 13 leading from the paved alley 11 up to the first floor. Entrance from the alley is also afforded by a flight of steps 14 leading into the basement. The flight of steps 13 leads to a landing 15 onto which the subordinate door 16 of the front apartment and the subordinate door 17 of the rear apartment open. The principal entrances, 18 for the front apartment and 19 for the rear apartment, open onto a landing 20 at the head of a flight of steps 21 which leads from the level of the principal entrance 12 to the level of the first floor. Another flight of steps 22 leads from the principal entrance 12 into the basement.

The front apartment and the rear apartment are separated by the stairways and the landings except for a small space where the partition 25 is the only thing between them. Next to the partition 25 are the pantries 26, one in each apartment. The kitchens 27 are next to the pantries and are entered from the landing 15 through the door 16 for the front apartment and the door 17 for the rear apartment. Next to the kitchen upon the side farthest from the landing 15 are the bathrooms 28, and next beyond them in the same direction are the bedrooms 29. Opening out of the kitchen 27 in a direction at right angles to the length of the house are the dining rooms 30 which are entered from the landing 20 by the entrance 18 for the front apartment and the entrance 19 for the rear apartment. The remaining corner of each apartment is occupied by the living room, 31 for the front apartment and 31' for the rear apartment. The living room 31 has a bay 33 projecting from the front of the apartment house. The living room 31' and the sleeping room 29 beside it are provided with sleeping porches 32 which project from the rear of the house.

It will be obvious that the detailed arrangement of the rooms here described is not necessary to the practice of this invention, but, in a general way, it will be true that the two apartments are symmetrically arranged so that the rooms toward the rear of the front apartment and the rooms toward the front of the rear apartment are the corresponding rooms. Such rule of symmetry need not, however, be strictly followed, as the illustration shows, for in this illustration the rear apartment has no bay and the front apartment has no sleeping porches. Other modifications which make the two apartments different from one another will suggest themselves to those skilled in the art. For example, the living room 31 is provided with a wide chimney 35 and a fireplace 40, but because the living room 31' seems smaller, not having the bay, it is provided only with a small chimney 36. The wall space saved in the room 31' by using a smaller chimney and omitting the fireplace provides an opportunity for a bay window 37. On the other hand, the fireplace 40 in the room 31 is to advantage flanked by bookcases 38.

I am aware that numerous details in the floor plan may be changed without departing from the spirit of this invention. I am also aware that numerous details of construction and arrangement of the whole block of apartment houses may be varied without departing from the spirit of this invention, and I therefore do not purpose limiting the patent to be granted otherwise than necessitated by the prior art.

I claim as my invention:

1. In an apartment house, a front apartment, a rear apartment on each floor and two stairways located between said apartments, and entrances to the house located on opposite sides thereof, those on one side of the house communicating with one stairway and those on the other side communicating with the other stairway.

2. In an apartment house, a front apartment and a rear apartment on the same floor, private entrances for each of said apartments, a wall separating said apartments and extending less than half the width of the house, and means including stairs for reaching the private entrances to the several apartments, said means occupying the remainder of the width of the house between the apartments.

3. In an apartment house a partition crosswise of the house and having a length less than half the width of the house, stairways opposite the two ends of said partition, said stairways and partition separating the house into front and rear apartments.

4. In an apartment house a partition crosswise of the house and having a length less than half the width of the house, stairways opposite the two ends of said partition, said stairways and partition separating the house into front and rear apartments, each apartment comprising a set of rooms, the smallest of the rooms in each apartment on the same floor being adjacent said partition.

5. In an apartment house, two apartments, a pantry in each apartment, a partition separating said pantries, and a stairway extending the combined length of said pantries.

In testimony whereof I have hereunto subscribed my name in the presence of two subscribing witnesses.

DOMINIK KOLLMER.

Witnesses:
CARLTON HILL,
H. WESCOTT WALKER.